United States Patent Office 3,213,419
Patented Oct. 19, 1965

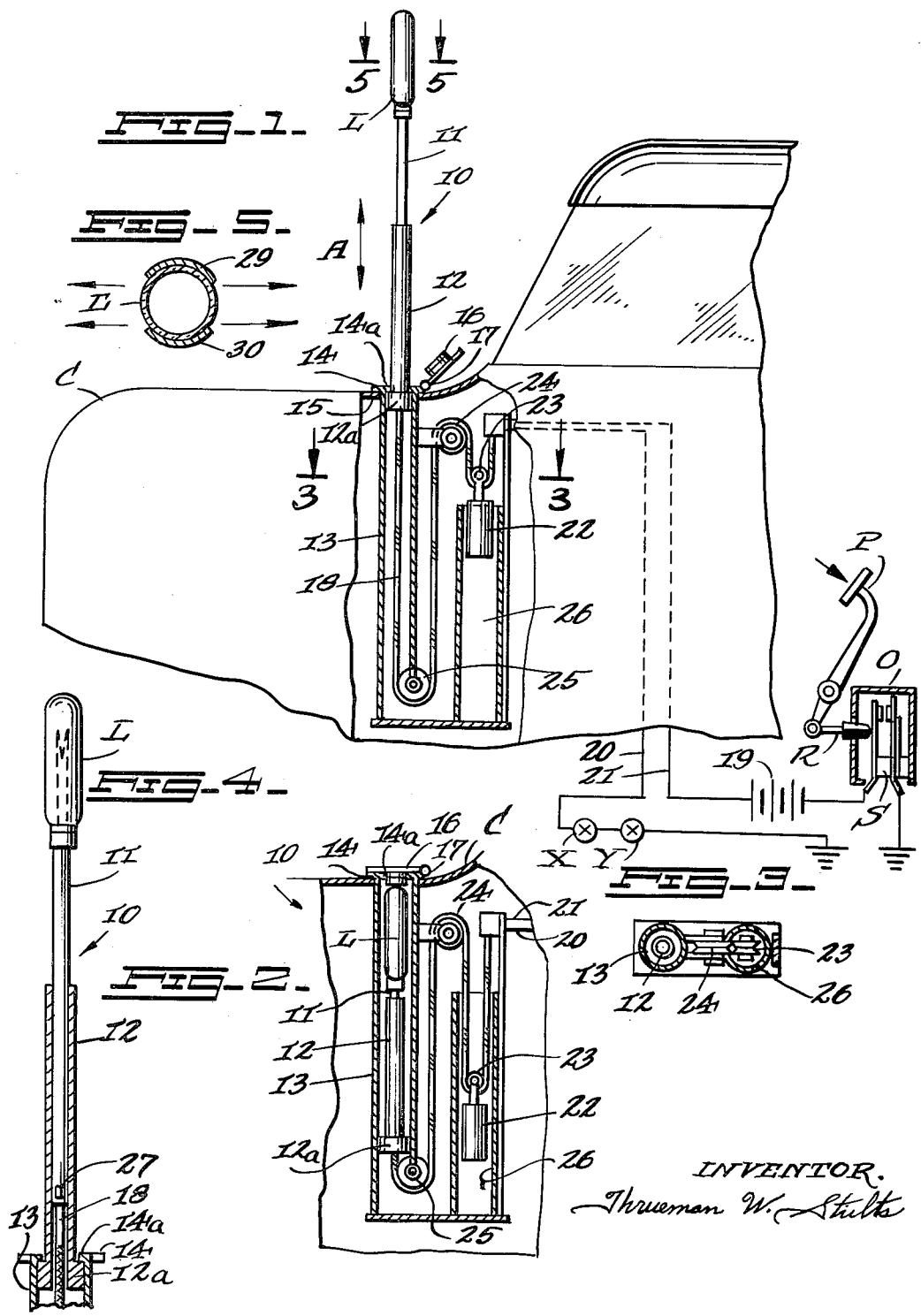

3,213,419
TELESCOPICALLY MOUNTED STOP LIGHT
FOR VEHICLE
Thrueman W. Stults, 6042 Banner St., Taylor, Mich.
Filed Nov. 7, 1963, Ser. No. 322,251
1 Claim. (Cl. 340—87)

The present invention relates to safety lights for present day automobiles, and more particularly it relates to a safety beacon stop light which may be readily installed upon a rod on top of an automobile and which may be electrically connected to the conventional stop light lamps in the rear of the vehicle, and operable in unison with the stop lights when the automobile brake is depressed. The primary object of this invention is to provide an auxiliary stop light which may be supported upon a slender rod extending beyond and above the roof top of the automobile and which may be readily visible to drivers in the cars driven behind the first automobile in a traffic lane. Upon engaging the brake pedal the red light atop the car will go on to indicate to the drivers behind that the automobile in front of them has stopped, or is about to reduce speed, and to signal to them that they too may reduce speed. This prompt action will avoid chain reaction collisions and accidents on heavy traveled highways and free-ways where cars in several lanes of traffic are traveling at a fast rate.

Furthermore, my safety beacon stop light allows the drivers in other cars an opportunity to appraise the traffic situation prevailing several car lengths ahead in a traffic lane. The safety beacon light atop the car in the front may be readily visible by all drivers in the lane instead of the driver directly behind the first car; a prevailing condition with stop lights in present day automobiles. With the safety beacon installed atop the roof of a car it is possible for all drivers in a string of traffic lanes to observe the light and take instant action to reduce their speed thus preventing running into each other in the event traffic is stalled or slowed down several cars ahead. It is, of course, understood that with every available automobile in present use provided with my safety beacon stop light, thousands of car accidents yearly may be avoided and many lives saved.

Another object of this invention is to provide a beacon stop light of the class described which may be inexpensive to manufacture, and easy to install as an auxiliary or as an accessory unit in present day automobile makes.

An additional object of this invention is to provide a beacon stop light which may be supported upon a slender rod and may be extended beyond and above the roof top of an automobile.

A further object of this invention is to provide the beacon stop light above the car with a shade which will prevent shedding of side light and will allow only the drivers in front and behind the automobile to observe the light when lit.

Another object of this invention is to provide a means for concealing the collapsible rod upon which the beacon light is mounted inside the body of the automobile.

This invention also consists in certain other features of construction, and the combination and arrangement of parts, to be hereinafter fully described, illustrated in the accompanying drawing, and specifically pointed out in the appended claim.

In describing the invention in detail, references will be made in the text to the accompanying drawing where like character numerals denote like or corresponding parts throughout the several views, in which:

FIG. 1 is a side elevational view showing a partial section through the present invention with the beacon stop light extended beyond and above the roof-top of an automobile. Also, it shows the wiring diagram.

FIG. 2 shows the present invention in its retracted position when not in use, housed within the body of the automobile;

FIG. 3 is a section taken on the line 3—3 of FIG. 1;

FIG. 4 is an enlarged cross-sectional view through the vertical rod supporting the beacon stop light, showing pertinent details of construction; and FIG. 5 is a section taken on the line 5—5 of FIG. 1.

It is to be understood that the present form of disclosure is merely for the purpose of illustration, and that there might be various modifications thereof, without departing from the spirit of the invention as herein set forth.

Referring now more particularly to the safety beacon stop light 10, made in accordance with the present invention, best seen in FIG. 1, it comprises, in combination, the vertical telescopic rod or support 11 which is vertically movable within the secondary tubular support 12. The latter may be mounted to slide vertically in the direction indicated by the arrow A in the tubular channel 13, which by means of the circular flange 14 may be mounted in the opening 15 cut in the body of the automobile C preferably right over the trunk compartment in the rear (although the safety beacon stop light 10 may be mounted as well in any other position upon the car's body, if necessary). A hinged cover 16, by means of the hinge 17 is held to the flange 14, substantially as shown. The vertical support 12, at its lowermost end 12a, may be of slightly greater diameter to form a natural stop which abuts against an inside circular lip 14a in the flange 14, to limit the vertical movement of the support 12, substantially as shown in FIG. 1.

It can be seen from FIGS. 1 and 2, respectively, that when the safety beacon stop light 10 is not in use, or in the event it is in the way washing the car, it may be withdrawn within its tubular housing 13 (see FIG. 2) by simply pushing the rod 11 into the housing 13 by hand. An electric cable 18 supplying current to the lamp L, atop the rod 11, from the car's battery 19, through the medium of the connecting wires 20 and 21, respectively, may be weighted down by means of the weight 22, which by means of the guiding rollers or pulleys 23, 24 and 25, respectively, rises and falls vertically within the cylindrical guide 26 as the cable 18 unwinds.

Reference now being made to FIG. 4 (which is an enlarged section through the telescopic rod 12, shown in FIGS. 1 and 2, inclusive) it can be seen that the vertical rod or support 11 may be supplied with a stop 27 which abuts against a lip (not shown) formed in the rod or support 12 to prevent override. From FIG. 5 (which is a section through the lamp L taken on the line 5—5 of FIG. 1) it is evident that the lamp L may be provided with a pair of blinders 29 and 30, respectively, which may act as shades to prevent the reflection of the light sideways, so as to allow the light from the lamp to shine only towards the front and the rear of the vehicle. It is also possible to paint the lamp L over in such a manner as to accomplish the same result; or the lamp L may be shaded in such a manner as to permit light to shine only towards the rear of the vehicle.

From the diagrammatic illustration of the electric circuit in FIG. 1, it can be seen that the rear stop lights X and Y of the automobile may be connected in series into the electric circuit of the safety beacon stop, lighted so that the latter may be lit simultaneously with the operation of the former. The safety beacon stop light 10 may be operated by means of the conventional brake pedal P and a lever and bush button R which in connection with the switch box O may operate the electric switch S. The switch S and the lights L, X and Y, respectively, are grounded.

From the above description of my invention it becomes obvious that my safety beacon stop light may be readily installed in every make of car and may add convenience and safety, and may reduce accidents on the highways. For best results the safety beacon stop light may be installed to an automotive vehicle in such a manner as to allow the top of the lamp L to extend at least six and one-half feet above the ground.

A careful examination of the foregoing description in conjunction with the invention as illustrated in the drawing, will enable the reader to obtain a clear understanding and impression of the alleged features of merit and novelty, sufficient to clarify the construction of the invention as hereinafter claimed.

Minor changes in shape, size, and materials, and rearrangement of parts, may be resorted to in actual practice, as long as no departure is made from the invention claimed.

Having described my invention, what I claim is the following:

A telescopic stop light of the class described for use in automotive vehicles comprising in combination a vertical telescopic rod means, a lamp mounted upon the upper end of said rod, said lamp being cylindrical in configuration, the cylindrical axis of said lamp being in a vertical plane, the light rays from said lamp being radiated outwardly through the cylindrical side of said lamp, a limiting stop at the opposite end of said telescopic rod means, said rod means housed to move vertically in the body of the said vehicle adjacent to the baggage trunk in the rear thereof, and an electric circuit including an electric cable means leading to said lamp, said cable means through the medium of said electric circuit connecting said lamp to the battery of said vehicle and to the conventional stop lights thereof in a series circuit, a switch in said circuit and a foot pedal, the operation of said switch by said foot pedal closing said switch to light simultaneously said stop light in said vehicle and the telescopic stop light aforesaid, said telescopic rod sliding in a vertically disposed housing in said vehicle with said electric cable following said rod when said rod is moved out of said housing, a weight take-up means for said electric cable, said weight take-up means ascending when said rod is moved out of said vehicle housing and said weight take-up means descending when said rod is retracted downwardly into said housing, a cylindrical guide into which said weight freely ascends and descends, a pair of take-up pulleys in said housing to facilitate the operation of said weight take-up means, an opening in said housing into which said telescopic rod is mounted to ride vertically, a hinged cover over said opening, said cover closing said opening when said telescopic rod is completely housed, and a pair of rotationally slidable oppositely spaced apart blinders adjacent the side of said lamp to permit directional control of the light from said lamp, said blinders being cylindrically arcuate in configuration to conform to the outer periphery of said lamp and said blinders limiting the portions of said cylindrical sides of said lamp through which said light rays may outwardly radiate.

References Cited by the Examiner

UNITED STATES PATENTS

| | | | |
|---|---|---|---|
| 815,498 | 3/06 | Weir | 178—95 |
| 1,828,097 | 10/31 | Colvin | 313—312 |
| 1,910,578 | 5/33 | Tillyer | 313—312 |
| 2,738,492 | 3/56 | Arneson et al. | 340—87 |
| 2,843,836 | 7/58 | McDonald | 340—87 |

NEIL C. READ, *Primary Examiner.*